United States Patent
Takubo et al.

(10) Patent No.: US 12,140,228 B2
(45) Date of Patent: Nov. 12, 2024

(54) PROTECTIVE RING, ADHESION SURFACE PROTECTIVE STRUCTURE INCLUDING THE SAME, AND ADHESION SURFACE PROTECTION METHOD

(71) Applicant: MITSUBISHI CABLE INDUSTRIES, LTD., Tokyo (JP)

(72) Inventors: Tsuyoshi Takubo, Hyogo (JP); Atsushi Hosokawa, Tokyo (JP); Nobuyuki Hayashi, Wakayama (JP)

(73) Assignee: MITSUBISHI CABLE INDUSTRIES, LTD., Tokyo (JP)

( * ) Notice: Subject to any disclaimer, the term of this patent is extended or adjusted under 35 U.S.C. 154(b) by 174 days.

(21) Appl. No.: 18/073,516

(22) Filed: Dec. 1, 2022

(65) Prior Publication Data

US 2023/0167900 A1    Jun. 1, 2023

(30) Foreign Application Priority Data

Dec. 1, 2021    (JP) .................................. 2021-195075

(51) Int. Cl.
  *F16J 15/02*    (2006.01)
  *F16J 15/10*    (2006.01)

(52) U.S. Cl.
  CPC ............. *F16J 15/022* (2013.01); *F16J 15/10* (2013.01); *F16J 15/025* (2013.01); *F16J 15/104* (2013.01)

(58) Field of Classification Search
  CPC .......... F16J 15/10; F16J 15/104; F16J 15/021; F16J 15/022; F16J 15/024; F16J 15/025
  See application file for complete search history.

(56) References Cited

U.S. PATENT DOCUMENTS

| | | | | |
|---|---|---|---|---|
| 4,304,415 | A * | 12/1981 | Wolf | F16L 47/065 277/625 |
| 5,692,758 | A * | 12/1997 | Wikstrom | F16J 15/106 277/591 |
| 7,159,874 | B2 * | 1/2007 | Hosokawa | F16J 15/123 277/642 |
| 9,869,392 | B2 * | 1/2018 | Schaefer | H01L 21/6838 |
| 10,943,808 | B2 * | 3/2021 | Noorbakhsh | F16J 15/022 |
| 11,255,468 | B2 * | 2/2022 | Ishibashi | F16L 23/18 |
| 11,359,722 | B2 * | 6/2022 | Maheshwari | F16J 15/064 |
| 11,781,650 | B2 * | 10/2023 | Schaefer | H01J 37/32532 29/505 |

(Continued)

FOREIGN PATENT DOCUMENTS

| | | |
|---|---|---|
| JP | 2014-058844 A | 4/2014 |
| JP | 2020-012512 A | 1/2020 |

(Continued)

*Primary Examiner* — Nicholas L Foster
(74) *Attorney, Agent, or Firm* — Rabin & Berdo, P.C.

(57) ABSTRACT

A protective ring with an annular shape that is formed of an elastic member and is mounted in an annular groove formed in a butt adhesion surface of a first cylindrical member and a second cylindrical member includes a band-shaped ring body and a ridge protruding from a center of an inner surface in a width direction and pressed against the annular groove. The ridge is continuously formed such that a cross section of the ridge is semicircular-shaped and has a smaller diameter than a width of the ring body, and the width of the ring body is larger than a thickness of the protective ring in a radius direction.

4 Claims, 2 Drawing Sheets

(56) References Cited

U.S. PATENT DOCUMENTS

| | | | |
|---|---|---|---|
| 2005/0285354 A1* | 12/2005 | Hosokawa | F16J 15/123 |
| | | | 277/641 |
| 2010/0027188 A1* | 2/2010 | Liu | H01L 21/6833 |
| | | | 361/234 |
| 2013/0340942 A1* | 12/2013 | Schaefer | H01J 37/32495 |
| | | | 29/505 |
| 2018/0151402 A1* | 5/2018 | Noorbakhsh | H01L 21/68785 |
| 2018/0299042 A1* | 10/2018 | Ishibashi | F16J 15/06 |
| 2019/0242480 A1 | 8/2019 | Nakagawa et al. | |
| 2020/0025292 A1* | 1/2020 | Maheshwari | F16J 15/064 |

FOREIGN PATENT DOCUMENTS

| | | | |
|---|---|---|---|
| JP | 6664298 B2 | | 3/2020 |
| JP | 2021044305 A | * | 3/2021 |

\* cited by examiner

PROTECTIVE RING, ADHESION SURFACE PROTECTIVE STRUCTURE INCLUDING THE SAME, AND ADHESION SURFACE PROTECTION METHOD

CROSS-REFERENCE TO RELATED APPLICATION

The present application claims priority under 35 U.S.C. § 119 to Japanese Patent Application No. 2020-195075 filed on Dec. 1, 2021. The contents of this application are incorporated herein by reference in their entirety.

BACKGROUND

The present disclosure relates to a protective ring, an adhesion surface protective structure including the protective ring, and an adhesion surface protection method, and more specifically, relates to a protective ring that is mounted in a groove with a bottom located on an adhesion surface where cylindrical members are adhered to each other and suppresses exposure of an adhesive on the bottom to a radical or plasma environment or the like.

As a protective ring of this type, conventionally, a ring having an annular cross section, that is, an O-ring, has been generally used.

On the other hand, for example, as described in Japanese Patent No. 6664298, a seal that is mounted in an annular groove and has a V-shaped cross section has been known.

As described also in Japanese Unexamined Patent Publication No. 2020-012512, an annular seal having a recessed portion in each of upper and lower surfaces has been known.

SUMMARY

In a case where an O-ring that contacts two side surfaces forming a V-shaped groove is extended and is thus mounted in the groove, some twists in the O-ring unavoidably occurs. In some cases, with such twists, insufficient sealing is caused to allow radical or plasma intrusion, or strains generated on a periphery become nonuniform to generate cracks and break the O-ring due to exposure of a portion with a large distortion to a radical or a plasma, so that a protection function is lost.

In techniques described in Japanese Patent No. 6664298 and Japanese Unexamined Patent Publication No. 2020-012512, a ring is compressed in an axial direction and is thus used, and therefore, only a groove formed such that two side surfaces among configuration surfaces extends in parallel or substantially in parallel to each other can be used. In order to mount a ring in a groove, a mechanism used for pressing the ring toward a central axis from outside of the groove while compressing the ring is required, and in an apparatus or the like in which there is no sufficient space around a groove, when the ring is deteriorated, it is difficult to remove the deteriorated ring or replace the deteriorated ring with a new ring.

In view of the foregoing, the present disclosure has been devised, and it is therefore an object of the present disclosure to prevent a twist of a protective ring during mounting of the protective ring while maintaining mountability of a butt adhesion surface in an annular groove, eliminate nonuniform deformations (strains) on a periphery when the protective ring is mounted, and suppress wear of the protective ring and generation of a crack in the protective ring along the entire periphery due to a radical or a plasma to increase a life of the protective ring.

In order to achieve the above-described object, according to the present disclosure, a shape of a protective ring has been devised.

Specifically, a first aspect is directed to a protective ring with an annular shape that is formed of an elastic member and is mounted in an annular groove formed in a butt adhesion surface of a first cylindrical member and a second cylindrical member, the protective ring includes a band-shaped ring body and a ridge protruding from a center of an inner surface in a width direction and pressed against the annular groove, the ridge is continuously formed such that a cross section of the ridge is semicircular-shaped and has a smaller diameter than a width of the ring body, and the width of the ring body is larger than a thickness of the protective ring in a radius direction.

According to the above-described configuration, each of the both ends of the ring body protrudes outside from the ridge, so that such a twist as that of an O-ring having a circular cross section hardly occurs and the annular groove can be reliably closed in a ridge portion. Since each of the both ends of the ring body protrudes from the ridge, the annular groove is less likely to be exposed to a radical or a plasma, as compared to the O-ring. Furthermore, while ensuring difficulty of twisting, a cross-sectional area is increased to prevent wear of the protective ring due to a radical, so that the life of the protective ring can be increased.

According to a second aspect, in the first aspect, the width $W1$ of the ring body is larger than 1.5 times the thickness $T1$ thereof in the radial direction, and $W1>1.5T1$ is satisfied.

According to the above-described configuration, the width $W1$ of the ring body is larger than 1.5 times the thickness $T1$ thereof in the radial direction. Therefore, even when a twist occurs during mounting, the twist can be easily found, and the cross-sectional area is increased, so that wear due to a radical or the like can be prevented.

According to a third aspect, in the first or second aspect, the protective ring is an integrally molded article formed of fluororubber, silicone rubber, or perfluoroelastomer.

According to the above-described configuration, the protective ring that is less likely to be deteriorated in a radical or plasma environment and has adequate elasticity can be achieved.

According to a fourth aspect, an adhesion surface protective structure that protects an annular groove formed in a butt adhesion surface of a first cylindrical member and a second cylindrical member with a protective ring with an annular shape that is formed of an elastic member and in which the annular groove is formed into a recessed shape having a semicircular cross section, a semiellipsoidal cross section, a triangular cross section, or a trapezoidal cross section, the protective ring includes a band-like ring body covering the annular groove from outside, and a ridge protruding from a center of an inner surface of the ring body in a width direction, abutting on the annular groove to close the annular groove, and having a semicircular cross section or a semiellipsoidal cross section, and each of both ends of the ring body covers a peripheral edge of the annular groove in a state where each of both ends protrudes from the ridge without each of the both ends of the ring body contacting the inner surface of the annular groove is provided.

According to the above-described configuration, each of the both ends of the ring body protrudes outside from the ridge, so that such a twist as that of an O-ring having a circular cross section hardly occurs and the annular groove formed in the butt adhesion surface of the first cylindrical member and the second cylindrical member can be reliably closed in a ridge portion. Each of the both ends of the ring body protrudes from the ridge, and therefore, the annular groove is less likely to be exposed to an environment of a radical, a plasma, or the like, as compared to the O-ring. Thus, an adhesive at the butt adhesion surface of the first cylindrical member and the second cylindrical member is protected and durability is increased.

According to a fifth aspect, in the fourth aspect, a width W1 of the ring body is larger than 1.5 times a thickness T1 thereof in the radial direction, and W1>1.5T1 is satisfied.

According to the above-described configuration, the width W1 of the ring body is larger than 1.5 times the thickness T1 thereof in the radial direction. Therefore, even when a twist occurs during mounting, the twist can be easily found, and the cross-sectional area is increased, so that wear due to a radical or the like can be prevented.

According to a sixth aspect, in the fifth aspect, the ridge has a semicircular cross section having a smaller diameter than a width of the ring body, a cross section of each of the both ends of the ring body is semicircular-shaped and has a smaller diameter than the radius of the cross section of the ridge.

According to the above-described configuration, a twist can be prevented with the ring body of the protective ring itself formed to have an adequate thickness, not too large thickness.

According to a seventh aspect, in any one of the fourth to sixth aspects, the first cylindrical member and the second cylindrical member are components of an electrostatic chuck, and the protective ring is configured to protect an adhesive at a butt adhesion surface from a radical or plasma environment in a semiconductor manufacturing apparatus.

According to the above-described configuration, the adhesive between the first cylindrical member and the second cylindrical member can be reliably protected, so that an electrostatic chuck with high durability can be achieved.

An eighth aspect is directed to an adhesion surface protection method for protecting an annular groove formed into a recessed shape having a semicircular cross section, a semiellipsoidal cross section, a triangular cross section, or a trapezoidal cross section in a butt adhesion surface of a first cylindrical member and a second cylindrical member, the adhesion surface protection method includes preparing a protective ring with an annular shape that is formed of an elastic member and includes a band-like ring body covering the annular groove from outside, and a ridge protruding from a center of an inner surface of the ring body in a width direction, abutting on the annular groove to close the annular groove, and having a semicircular cross section or a semiellipsoidal cross section, extending the protective ring to cover the annular groove from outside, pressing the ridge of the protective ring that has been contracted to bring the ridge into press contact against an inner surface of the annular groove, and covering a peripheral edge of the annular groove by the ring body in a state where each of both ends of the ring body protrudes from the ridge without each of the both ends of the ring body contacting the inner surface of the annular groove.

According to the above-described configuration, each of the both ends of the ring body protrudes outside from the ridge, so that such a twist as that of an O-ring having a circular cross section hardly occurs and the annular groove formed in the butt adhesion surface of the first cylindrical member and the second cylindrical member can be reliably closed in a ridge portion. Since each of the both ends of the ring body protrudes from the ridge, the annular groove is less likely to be exposed to an environment of a radical, a plasma or the like, as compared to the O-ring. Thus, an adhesive at the butt adhesion surface of the first cylindrical member and the second cylindrical member is protected and durability is increased.

As has been described above, according to the present disclosure, a protective ring can be accurately mounted so as to be able to exhibit an original function thereof and, as a result, protective effect and product life thereof can be increased.

DETAILED DESCRIPTION

Embodiments will be described below with reference to the accompanying drawings.

—Adhesion surface Protective Structure and Protective Ring—

Figure 1:
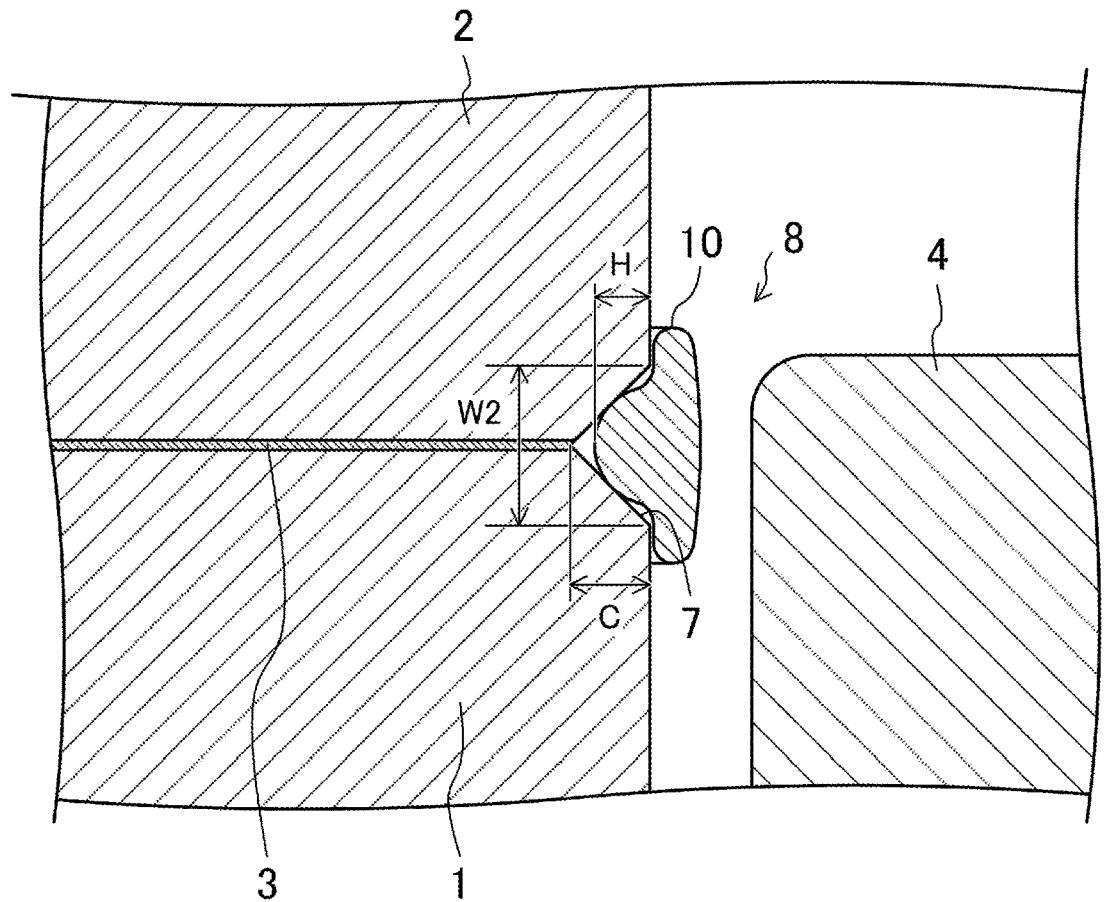
FIG. 1 is an enlarged cross-sectional view of a portion I in FIG. 3.
Figure 2:
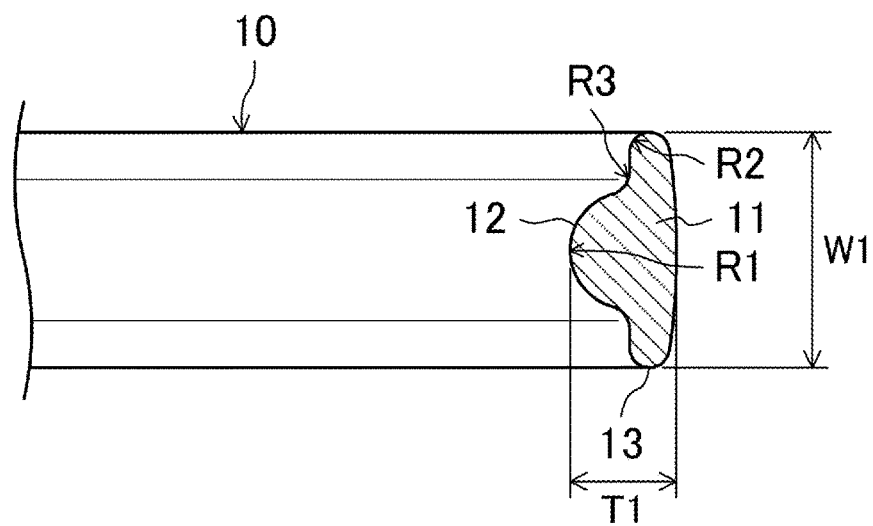
FIG. 2 is a cross-sectional view illustrating an enlarged protective ring according to an embodiment of the present disclosure.
Figure 3:
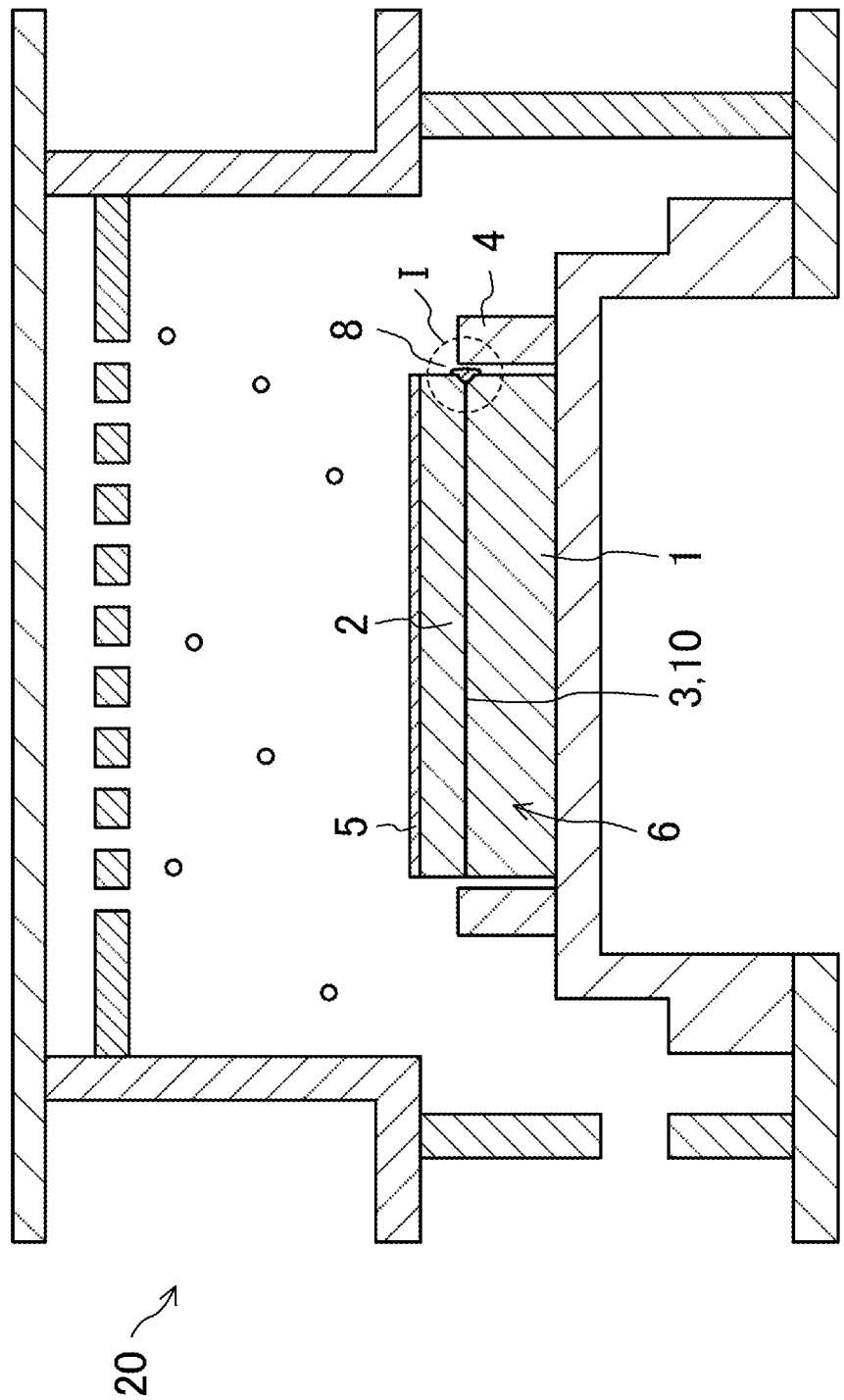
FIG. 3 is a cross-sectional view illustrating an outline of a semiconductor manufacturing apparatus including an adhesion surface protective structure according to the embodiment of the present disclosure.

As illustrated in FIG. 1 to FIG. 3, a semiconductor manufacturing apparatus 20 including an adhesion surface protective structure 8 according to an embodiment of the present disclosure includes an electrostatic chuck 6 that sucks and fixes a semiconductor wafer 5 by an electrostatic force. An outer periphery of the electrostatic chuck 6 is covered by an outer cylindrical member 4 and inside of the semiconductor manufacturing apparatus 20 is exposed to a radical or plasma environment to process the semiconductor wafer 5.

A base board 1 as a first cylindrical member and an electrode portion 2 as a second cylindrical member each forming a component of the electrostatic chuck 6 are fixed at a butt adhesion surface by an adhesive 3. A protective ring 10 according to this embodiment protects the adhesive 3 at the butt adhesion surface. The adhesive 3 is preferably, for example, a silicone resin-based adhesive, specifically, to which a filler is added to increase thermal conductivity.

As illustrated in an enlarged form in FIG. 1, the adhesion surface protective structure 8 of this embodiment has a configuration in which an annular groove 7 formed in the butt adhesion surface of the base board 1 and the electrode portion 2 is protected by the protective ring 10 with an annular shape that is formed of an elastic member. Specifically, the protective ring 10 is configured to protect the adhesive 3 from the radical or plasma environment in the semiconductor manufacturing apparatus 20.

The annular groove 7 is, for example, formed into a recessed shape having a triangular cross section. In this embodiment, the cross section is an isosceles-triangular cross section. For example, the annular groove 7 is formed such that a portion at an electrode portion 2 side is chamfered with a chamfer dimension of 0.7 mm and a portion at a base board 1 side is also chamfered with a chamfer dimension of 0.7 mm.

On the other hand, for example, the annular groove 7 may be formed to have an isosceles-triangular cross section by forming a radius of the electrode portion 2 slightly smaller than a radius of the base board 1. In this case, the annular groove 7 may be formed such that the portion at the electrode portion 2 side is chamfered with a chamfer dimension of 0.5 mm and the portion at the annular groove 7 side is chamfered with a chamfer dimension of 0.7 mm. The annular groove 7 may be formed to have a circular cross section such that a cross section of a groove side surface of the annular groove 7 is arc-shaped or may be formed to have a bottomed trapezoidal cross section.

As illustrated in an enlarged form in FIG. 2, the protective ring 10 includes a band-shaped ring body 11 covering the annular groove 7 from outside and a ridge 12 that has a semicircular-shaped cross section to abut on the annular groove 7 and close the annular groove 7.

The protective ring 10 is, for example, an integrally molded article formed of fluororubber, silicone rubber, or perfluoroelastomer. The protective ring 10 is formed of any one of the above-described materials by injection-molding using an injection molding die.

The cross section of the ridge 12 may be semielliptical-shaped or semioval-shaped, not semicircular-shaped. A portion having an arc-shaped cross section is pressed into contact with side surfaces of the annular groove 7, so that the adhesive 3 can be reliably sealed. The cross section of the ridge 12 is semicircular-shaped and has a radius R1 smaller than a width W1 of the ring body 11 (R1<W1) and the radius R1 of the ridge 12 is, for example, 0.5 mm. It is considered that the radius R1 is a large radius, as compared to a radius, that is, 0.3 mm, of a known O-ring.

A cross section of each of both ends 13 of the ring body 11 is semicircular-shaped and has a radius R2 that is smaller than the radius R1 of the cross section of the ridge 12 (for example, R2=0.17 mm) (R2<R1). That is, each of the both ends 13 is formed to be as thick as possible and have a round shape. The width W1 of the ring body 11 is larger than a width W2 of the annular groove 7 (W1>W2) and is, for example, 2 mm. The width W2 of the annular groove 7 is about 1.0 mm in a case where the annular groove 7 is chamfered with a chamfer dimension of 0.7 mm.

As illustrated in FIG. 2, the protective ring 10 is vertically symmetrical with respect to a center line in center in a width direction as a boundary. Thus, in mounting the protective ring 10 in the annular groove 7, the protective ring 10 is not mounted in a vertically inversed state.

Then, when the annular groove 7 is covered by the protective ring 10, while a curved surface of the ridge 12 of the protective ring 10 is pressed into contact with an inner surface of the annular groove 7, the both ends 13 of the ring body 11 do not abut on an internal surface of the annular groove 7 and, when viewed from outside in a radial direction, the annular groove 7 is not exposed.

The width W1 of the ring body 11 is larger than a thickness T1 of the entire protective ring 10 in the radial direction (W1>T1). Preferably, the width W1 of the ring body 11 is larger than 1.5 times the thickness T1 in the radial direction, and W1>1.5T is satisfied. For example, for W1=2.0 mm, T1=0.9 mm. That is, since the W1 is set as large as possible, even when a twist occurs during mounting, the twist can be easily found. Even when a cross-sectional area of the protective ring 10 is increased, wear due to a radical or the like can be prevented.

A corner portion continuously extending from each of the both ends 13 to the ridge 12 is formed to have as a small radius as possible in order to prevent interference to a peripheral edge of the annular groove 7 and, for example, have R3=0.2 mm. A sharp tip portion or corner portion is not provided and a smooth cross section in which a curved line is entirely continuously formed is provided, so that stress is less likely to be concentrated and the protective ring 10 is less likely to be broken.

In this embodiment, the protective ring 10 is formed of any one of the above-described materials by injection molding using an injection molding die, and therefore, the protective ring 10 that is easily manufactured, is hardly deteriorated in a radical or plasma environment, and has an adequate elasticity can be achieved.

Moreover, in this embodiment, each of the both ends 13 is formed to be as thick as possible and have a round shape, and thus, the body of the protective ring 10 itself has an adequate thickness, not a too large thickness, so that a twist can be prevented. The radius R2 of the cross section of each of the both ends 13 is not too small, and therefore, cleaning of the injection molding die using sodium bicarbonate or dry ice can be easily performed.

—Adhesion surface Protection Method—

Next, an adhesion surface protection method according to this embodiment will be described.

First, the adhesive 3 is applied between the base board 1 and the electrode portion 2 to butt and adhere the base board 1 and the electrode portion 2 against each other. The adhesive 3 is exposed at a bottom portion of the annular groove 7.

Next, while the protective ring 10 is pulled from a side of either one of the base board 1 or the electrode portion 2 to be extended, the protective ring 10 is fitted to the annular groove 7 so as to cover the annular groove 7 from outside.

At this time, the ridge 12 of the protective ring 10 is pressed into contact with the inner surface of the annular groove 7. On the other hand, each of both ends 13 of the ring body 11 covers the peripheral edge of the annular groove 7 in a state where each of both ends 13 protrudes from the ridge 12 without each of the both sides of the ring body 11 contacting the inner surface of the annular groove 7.

When the protective ring 10 is pulled to be extended and is thus fitted to the annular groove 7, a semispherical portion of the ridge 12 is pressed into contact with the side surfaces of the annular groove 7 by a compression force generated then without any space therebetween.

As described above, each of the both ends 13 of the ring body 11 protrudes outside from the ridge 12, so that, when the protective ring 10 is about to twist like an O-ring having a circular cross section, the both ends 13 abuts on the peripheral edge of the annular groove 7, and therefore, the protective ring 10 does not further twist.

Therefore, a portion of the ridge 12 can reliably close the annular groove 7 formed in a butt adhesion surface of the base board 1 and the electrode portion 2.

Furthermore, the protective ring 10 may be fitted to the annular groove 7 by extending an outer diameter of the protective ring 10, and therefore, a mechanism that presses a ring while compressing the ring as in the known technology is not necessary. Even when the outer cylindrical member 4 is outside the annular groove 7 in the radial direction, attachment and removal of the protective ring 10 are extremely easy.

Moreover, each of the both ends 13 of the ring body 11 protrudes from the ridge 12, and therefore, the protective ring 10 itself and the annular groove 7 are less likely to be exposed to a radical or a plasma, as compared to an O-ring. Thus, the adhesive 3 at the butt adhesion surface of the base board 1 and the electrode portion 2 is protected and durability is increased.

In the above-described embodiment, the protective ring 10 includes the ring body 11 having adequate thickness and width, and therefore, while ensuring difficulty of twisting, a cross-sectional area is increased to prevent wear of the protective ring 10 due to a radical, so that the life of the protective ring 10 can be increased.

As has been described above, according to the present disclosure, the protective ring 10 can be accurately mounted so as to be able to exhibit an original function thereof and, as a result, protective effect and product life thereof can be increased. Moreover, the electrostatic chuck 6 with high durability can be achieved by reliably protecting the adhesive 3 between the base board 1 and the electrode portion 2.

OTHER EMBODIMENTS

According to the present disclosure, the above-described embodiments may be implemented in the following configuration.

That is, in the above-described embodiment, the annular groove 7 is formed into a shape with a V-shaped cross section, but the annular groove 7 may be formed into a U-shape with a partial bottom or a lateral U-shape.

In the above-described embodiment, the cross section of the ridge 12 is semicircular-shaped but may be semi ellipsoidal-shaped or semioval-shaped, and in other words, the ridge 12 may be formed into a shape that can be pressed into contact with the annular groove 7 having a triangular cross section, a trapezoidal cross section, a U-shaped cross section, or the like, and be thus sealed.

In this embodiment, a height H of the ridge 12 illustrated in FIG. 1 is approximately equal to R1, but in some cases, the cross section of the ridge 12 is semiellipsoidal-shaped or the like and the height H is not approximately equal to R1. For example, as in this embodiment, in a case where the annular groove 7 is chamfered at 45 degrees, when a depth of the annular groove 7 is C, a radius R of a curved surface that abuts on a peripheral edge portion of the annular groove 7 is R=C×√2, and therefore, the height H of the ridge 12 satisfies H>R−R/2×√2 for the radius R of the curved surface. This represents a relationship in which the curved surface of the ridge 12 abuts on the side surface of the annular groove 7. This is because, when H<R−R/2×√2 is satisfied, the curved surface of the ridge 12 abuts on the peripheral edge portion of the annular groove 7, and thus, hardly abuts on the side surface of the annular groove 7, so that a sufficient sealing degree cannot be achieved.

In the above-described embodiment, each of the base board 1 and the electrode portion 2 is a component member of the electrostatic chuck 6 of the semiconductor manufacturing apparatus, but is not limited thereto. In other words, the present disclosure is applicable to a portion that is mounted in an annular groove formed in a butt adhesion surface of a first cylindrical member and a second cylindrical member to protect an adhesive or the like on the adhesive surface such that the adhesive is not deteriorated.

Note that the above-described embodiment is merely a preferable example by nature and is not intended to be particularly limiting the present disclosure, application of the present disclosure, and the scope of use.

What is claimed is:

1. A protective ring with an annular shape that is formed of an elastic member and is mounted in an annular groove formed in a butt adhesion surface of a first cylindrical member and a second cylindrical member, the protective ring comprising:
    a band-shaped ring body; and
    a ridge protruding from a center of an inner surface of the ring body in a width direction and pressed against the annular groove,
wherein
    the ridge is continuously formed such that a cross section of the ridge is semicircular-shaped and has a smaller diameter than a width of the ring body, and
    the width of the ring body is larger than a thickness of the protective ring in a radius direction.
2. The protective ring of claim 1, wherein
the width W1 of the ring body is larger than 1.5 times the thickness T1 thereof in the radial direction, and
W1>1.5T1 is satisfied.
3. The protective ring of claim 1, wherein
the protective ring is an integrally molded article formed of fluororubber, silicone rubber, or perfluoroelastomer.
4. The protective ring of claim 2, wherein
the protective ring is an integrally molded article formed of fluororubber, silicone rubber, or perfluoroelastomer.

* * * * *